United States Patent [19]

Murphy et al.

[11] Patent Number: 5,336,515

[45] Date of Patent: * Aug. 9, 1994

[54] POLYSACCHARIDE HYDROCOLLOID-CONTAINING FOOD PRODUCTS

[75] Inventors: Gregory B. Murphy, Sands Point; Kevin W. Lang, Lloyd Neck; Barry N. Frake, Northport; William J. Entenmann, Islip, all of N.Y.

[73] Assignee: Kraft General Foods, Inc., Northfield, Ill.

[ * ] Notice: The portion of the term of this patent subsequent to Jul. 28, 2009 has been disclaimed.

[21] Appl. No.: 965,389

[22] PCT Filed: Jun. 15, 1990

[86] PCT No.: PCT/US90/03408

§ 371 Date: Dec. 15, 1992

§ 102(e) Date: Dec. 15, 1992

Related U.S. Application Data

[63] Continuation-in-part of Ser. No. 366,902, Jun. 15, 1989, abandoned.

[51] Int. Cl.$^5$ .............. A23L 1/0534; A23L 1/054
[52] U.S. Cl. ..................... 426/573; 426/506; 426/549; 426/572; 426/574; 426/575; 426/578; 426/618; 426/656
[58] Field of Search .............. 426/549, 572, 573, 574, 426/575, 578, 618, 656, 506

[56] References Cited

U.S. PATENT DOCUMENTS

| | | | |
|---|---|---|---|
| 3,234,027 | 2/1966 | Jertson et al. | 426/19 |
| 3,574,634 | 4/1971 | Singer | 426/62 |
| 3,676,150 | 7/1972 | Glicksman et al. | 426/553 |
| 4,109,018 | 8/1978 | Thompson | 426/62 |
| 4,109,025 | 8/1987 | Lauck | 426/551 |
| 4,143,163 | 3/1979 | Hutchinson et al. | 426/96 |
| 4,198,438 | 4/1980 | Singer et al. | 426/549 |
| 4,219,580 | 8/1980 | Torres | 426/549 |
| 4,308,294 | 12/1981 | Rispoli et al. | 426/294 |
| 4,424,237 | 1/1984 | Wittman, III | 426/653 |
| 4,427,701 | 2/1984 | Morley | 426/36 |
| 4,431,681 | 2/1984 | Hegedus et al. | 426/553 |
| 4,451,490 | 5/1984 | Silverman et al. | 426/553 |
| 4,503,083 | 3/1925 | Glicksman et al. | 426/553 |
| 4,559,233 | 12/1985 | Chen et al. | 426/104 |
| 4,563,360 | 1/1986 | Soucie et al. | 426/104 |
| 4,565,702 | 1/1986 | Morley et al. | 426/93 |
| 4,590,076 | 5/1986 | Titcomb et al. | 426/62 |
| 4,762,726 | 8/1988 | Soucie et al. | 426/602 |
| 4,774,099 | 9/1988 | Feeney et al. | 426/552 |
| 4,824,683 | 4/1989 | Hodgson et al. | 426/62 |
| 4,834,990 | 5/1989 | Amer | 426/550 |
| 4,847,108 | 7/1989 | Inoue et al. | 426/653 |
| 4,865,863 | 9/1989 | Prosise et al | 426/518 |
| 4,876,102 | 10/1989 | Feeney et al. | 426/550 |
| 4,892,762 | 1/1990 | Abdelrahman | 426/549 |
| 4,971,823 | 11/1990 | Fahlen | 426/549 |
| 5,133,984 | 7/1992 | Murphy et al. | 426/656 |

FOREIGN PATENT DOCUMENTS 340035 11/1989 European Pat. Off. .
US89/01813 11/1989 PCT Int'l Appl. .

OTHER PUBLICATIONS

Slim-Fast Nutritional Meal, Thompson Medical Company.

Tressler, et al. Food Products Formulogy, vol. 2, AVI Publishing, 1975, p. 25, 118–119.

Avicel Bulletin: RC-53, FMC Corp. (updated).

*Primary Examiner*—Helen Pratt
*Attorney, Agent, or Firm*—Thomas R. Savoie; Thomas A. Marcoux

[57] ABSTRACT

Food products, typically having a moisture content above 50% by weight, are prepared which contain polysaccharide hydrocolloid and insoluble fiber at a weight ratio of 1:0.2–3.5:1.1–4.5. These materials are preferably added to the food product as an aqueous dispersion. The aqueous dispersion preferably also contains a protein material. This invention is particularly useful in the preparation of fat-free food products.

14 Claims, No Drawings

POLYSACCHARIDE HYDROCOLLOID-CONTAINING FOOD PRODUCTS

This application is a continuation-in-part of Ser. No. 366,902, filed Jun. 15, 1989 and now abandoned.

TECHNICAL FIELD

Our invention relates to the production of reduced-fat and polysaccharide hydrocolloid-containing fluid or high-moisture food products such as salad dressings, ice cream, icings, meats and the like.

The reduction of dietary fat consumption is of concern to a great many consumers, such as dieters seeking to reduce their caloric intake and health-conscious consumers wishing to reduce the amount of calories consumed from fat. Thus, commercially-acceptable ways to reduce or eliminate fat from various food products are much sought after.

BACKGROUND ART

Many prior art disclosures recite the incorporation of materials such as gums, cellulosic fiber or protein into food products in a manner to either partially or fully replace fat. Among such prior art disclosures are U.S. Pat. Nos. 4,143,163 to Hutchinson et al.; 4,308,294 to Rispoli et al.; 4,734,287 to Singer et al.; and published EPO application 340,035 and published PCT application 89/01813 both to Chen et al.

DISCLOSURE OF THE INVENTION

The present invention is directed to the use of hydrated, polysaccharide hydrocolloids in combination with insoluble fiber and, if desired, protein material, in order to improve the functional and/or organoleptic attributes of reduced-fat and fat-free products.

The use of hydrated, polysaccharide hydrocolloids, together with hydrated insoluble fiber and, as desired, hydrated protein material, as taught in this invention, will find utility in a wide variety of food products to eliminate or reduce fat content. It is believed that the hydrated, polysaccharide hydrocolloids, with added insoluble fiber and, as desired, protein material, function as an efficient water binding material which provides a lubricity and mouthfeel to the product which resembles that normally provided by fat. It is also thought that the insoluble fiber will disrupt the gummy texture which polysaccharides hydrocolloids can impart to fluid or high-moisture foodstuffs.

The polysaccharide hydrocolloids and insoluble fiber, along with any protein material may be incorporated into the food product in a hydrated state, typically as a preformed aqueous dispersion. It would be possible, however, to add unhydrated polysaccharide hydrocolloids and/or insoluble fiber and/or any protein directly to the food product formulation, provided enough water is present and enough time is allowed to permit hydration of the hydrocolloids, insoluble fiber and protein before the product is used. When added in the form of an aqueous dispersion, the dispersion should have a thick, paste-like consistency and a viscosity of at least 6, preferably at least 8 and most preferably at least 12, as measured at 40° F. using a Brookfield Model HAT Viscometer with a helipath stand and a size-D, T-Bar spindle at 5 RPMs scale (0–100). The aqueous dispersion should also have a solids content, based on the amount of polysaccharide hydrocolloid, insoluble fiber, protein and water components present in the dispersion of from 2 to 35% by weight, preferably from 5 to 30% and most preferably from 9 to 25%. The solids content of the dispersion will be adjusted based primarily on obtaining a viscosity which is easy to handle and incorporate into the food product, as well as the amount of water which may be added to the food product.

The polysaccharide hydrocolloids used in this invention are preferably non-gelling gums, such as xanthan, guar, CMC (carboxymethyl cellulose) and the like. Gums which form gels, such as alginates, pectin, kappa and iota carrageenan and the like are not preferred for use in this invention. Non-polysaccharide hydrocolloids, such as gelatin, have not been found to be suitable for use in this invention.

A combination of an anionic polysaccharide hydrocolloid and a galactomannan polysaccharide hydrocolloid has been found to be preferred for use in this invention. The anionic polysaccharide will preferably include within its molecular structure dependent carboxylic acid groups. Xanthan gum and carboxymethyl cellulose are such polysaccharides. Galatomannans are polysaccharide composed solely of mannose and galactose. Guar gum, a galactomannan which has a mannose-to-galactose ratio of about 1.8:1 has proven to be well-suited for use in this invention.

Combinations of xanthan gum and guar gum at a weight ratio of 1:4 to 4:1, preferably 1:3 to 3:1 and most preferably about 1:1, have been found to be highly-preferred for use in this invention. Xanthan gum is a high molecular weight polysaccharide which is obtained by pure culture fermentation of glucose with a bacterium of the genus *Xanthamonas*, such as *Xanthomones campestris*. Xanthan is a heteropolysaccharide made up of building blocks of D-glucose, D-mannose and D-glucuronic acid. Guar gum is isolated from the seeds of the guar bean (*Cyamposis Tetragonaolobas L. taub.*) which is native to India and Pakistan.

The insoluble fiber which may be employed in this invention can be any edible fiber material, including powdered cellulose (at least 95% insoluble fiber). Fiber derived from cereal grains (e.g., oat, wheat, corn, soy, etc.) is well-suited for use in this invention. Oat fiber, which contains a relatively-high level (at least 85%) of insoluble fiber, soy fiber and wheat fiber have been successfully used in the practice of this invention. The particles of fiber in the aqueous dispersions of this invention may have an average particle size of between about 10 and 200 microns, preferably between 10 and 100 microns. The size of the fiber particles will be a function of the particle size of the selected raw material and the amount of fiber particle fracture resulting from the mixing and/or homogenization employed to produce any aqueous dispersion.

The protein material which can be used in this invention may be an essentially-pure protein, as in the case of whey protein or casein, or as part of a protein containing material, such as dry non-fat milk solids, dried egg whites, soy protein, wheat protein, wheat gluten, etc. Non-fat milk solids (about 36% protein) have been found to be useful in this invention. Proteins, such as casein, which form protein micelles in an aqueous dispersion should also be suitable for use in this invention. The protein may be at least partially denatured as denatured protein has higher water absorption properties than undenatured protein.

Any aqueous dispersion used in the practice of this invention, may contain additional ingredients such as dispersing agents (e.g. sugars and/or maltodextrin), free-flow agents, preservative systems (e.g. potassium sorbate), flavor systems, coloring agents, etc. Emulsifiers are not needed in the aqueous dispersions of this invention; however, if included emulsifiers would be present at a level below that of the polysaccharide hydrocolloids. The pH of the dispersion should be maintained above about 5.0 in order to avoid adverse effects upon any protein component. In any dispersion produced, according to this invention, the components of the aqueous dispersion do not form a complex. Although not preferred, the components could be hydrated separately and three dispersions added to the food product formulation. The materials of this invention are thus unlike the gum-protein complexes described in the aforementioned Chen et al. disclosures.

This invention has been found to be useful in the production of salad dressings, such as, but not limited to mayonnaise, Italian, French and Russian, frozen confections, such as ice cream, ice milk, frozen yogurt and the like, sauces, gravies, peanut butter, meat products, such as hamburger, hot dogs, sausage and the like, soups, fillings and toppings. This invention is readily used in connection with foodstuffs which have a moisture content above 45%, typically above 50%. It may be desirable to modify existing food product formulations and processes in order to optimize the use of our invention, but this can be done on a product-by-product basis, as desired, by skilled food technologists.

It would also be possible to dry, such as by freeze drying, any hydrocolloid-containing dispersions desired for use according to this invention. This dried material could then be hydrated prior to being incorporated into a dough or batter formulation.

All percents and ratios used throughout this disclosure are by weight and based on the dry weight of the hydrated hydrocolloid polysaccharide, insoluble fiber and/or protein. Thus, if a fiber material contains both soluble and insoluble constitutents, only the weight of insoluble fiber is considered. Likewise, if a protein material, such as milk solids or vegetable protein concentrates, contain non-protein components, only the weight of the protein is considered.

According to this invention, the fatty material contained in food product formulations can be substantially eliminated or reduced. As a substitute for fat the polysaccharide hydrocolloid-insoluble fiber materials of this invention are typically able to replace fat at a rate of about one part hydrocolloid for each 40 to 60 parts of fat. If an aqueous dispersion is used, the dispersion is typically prepared so that the substitution of the dispersion for fat will be at a ratio of 0.5–1.5 to 1, typically about 1 to 1.

As used herein, fat-free or substantially fat-free is meant that the food product formulation is free of overtly added fat materials, such as vegetable fats and oils. Low amounts of fat that would naturally be present from other ingredients, such as monoglycerides, which could be present in the formulation as emulsifiers, are not to be excluded by the term fat-free. Food products which have a fat content of less than 0.5 grams per serving are considered to be included in the term "fat-free".

According to this invention, the polysaccharide hydrocolloids are included in the food product formulations at a level of from 0.05 to 2.0, preferably 0.05 to 1.0, parts per 100 parts of water. The insoluble fiber is present in the formulation at a level of 0.05 to 2.0, preferably 0.05 to 1.0, per 100 parts of water. The ratio of polysaccharide hydrocolloid to insoluble fiber should be from 1:0.2–3.5, preferably 1:0.8–3.0. The preferred ratio of hydrocolloid to any protein in the dispersion would be from 1:1.1–4.5.

A benefit derived from the use of a prepared aqueous dispersion is that any of the materials contained therein can be hydrated at a location or time remote from the production of the foodstuff. In this manner existing processes do not have to be modified.

According to a specific embodiment of this invention, aqueous dispersions are prepared which contain polysaccharide hydrocolloid, insoluble fiber and protein at a weight ratio of 1:0.2–3.5:1.1–4.5, preferably 1:0.8–3.0:1-.5–3.5 and most preferably 1:1.5–2.0:2.0–3.0.

The process for preparing any aqueous dispersion used in connection with this invention may be any technique which both hydrates the ingredients and produces a uniform distribution of solids within a stable aqueous dispersion. The process may be accomplished in a one, two or more step operation. Most typically, however, a procedure is followed in which the dry ingredients are first combined in a batch-type mixer and the resulting mix is passed through a mixing unit which will produce a uniform aqueous dispersion, such as a homogenizer or a continuous mixer. Thereafter, the dispersion should be pasteurized such as by heating to above about 160° F. (71.1° C.) for up to ten minutes. The dispersion is preferably maintained at 40° F. (4.4° C.) or below in order to ensure microbial stability.

EXAMPLE 1

An aqueous dispersion was produced with the following composition:

| Ingredient | (Weight %) |
|---|---|
| Water | 79.7 |
| Xanthan gum | 1.0 |
| Guar gum | 1.0 |
| Dextrose | 2.3 |
| Oat fiber (88.4% insoluble fiber) | 3.6 |
| Milk solids non-fat (36% protein) | 12.4 |

The dispersion was prepared by thoroughly blending all the dry ingredients and then, using a Hobart TM A-200 mixer with a 20-quart bowl and a wire whip, mixing all of the ingredients for 30 seconds on 2nd speed. This pre-mix was then passed through a Gaulin TM laboratory homogenizer (14M-8TA) at 1500 psi 1st stage and 500 psi 2nd stage. The resulting product was a smooth aqueous dispersion with a moisture content of 81.5% and a pH of 6.7.

EXAMPLE 2

A fluid, cheese filling containing about 65% moisture and suitable for use in non-fat baked goods was prepared with the following ingredients:

| Ingredient | (Weight %) |
|---|---|
| Baker's Cheese Curd (75–80% Water) | 50.00 |
| Sugar | 15.00 |
| Instant Starch | 3.00 |
| Salt | 0.60 |
| Emulsifier | 2.50 |
| Aqueous Dispersion (Example 1) | 15.50 |
| Flavor | 0.78 |
| Water | 12.50 |
| Preservative | 0.06 |

| Ingredient | (Weight %) |
| --- | --- |
| Xanthan Gum | 0.06 |

The sugar, starch, salt, preservative and xanthan gum ingredients were pre-blended using a Hobart TM A-200 mixer with a 12-quart bowl and a paddle. The cheese, pre-blend and flavors were then mixed, the aqueous dispersion and water was added and mixing was continued to obtain a smooth consistency. The resulting mixture was an acceptable cheese filling for baked goods and could be substituted for a conventional cheese filling containing about 12% fat.

EXAMPLE 3

A fat-free Italian salad dressing containing 79% moisture was made according to the following recipe. Thirty grams of water were added to a cruet followed by 56.8 grams of cider vinegar, a packet (19.8 grams) of Good Seasons ® brand Italian salad-dressing mix and 30 grams of the aqueous dispersion of Example 1. The contents of the cruet were then hand-shaken vigorously. Additional water (about 110 grams) was added to fill the cruet to eight fluid ounces (346.6 ml) and the contents were again hand-shaken vigorously. The resulting dressing functioned well as a salad dressing when compared to a comparable dressing which contained 113 grams of oil per eight fluid ounces (236.6 ml).

The aqueous dispersion of Example 1 was freeze-dried and then ground. Six grams of this material were used in place of the aqueous dispersion. Again an acceptable Italian salad dressing was produced.

Six grams of the dry ingredients of the aqueous dispersion of Example 1 were also used in place of the aqueous dispersion. An acceptable Italian salad dressing was produced having a slightly lower viscosity as compared to the dressing which utilized the aqueous dispersion.

Thirty grams of a protein-free aqueous dispersion having a 20% solids content (1.91% xanthan gum, 1.91% guar gum, 8.60% oat fiber, 4.29% dextrose and 3.34% maltodextrin) was used in the salad dressing in place of the dispersion of Example 1. The resulting salad dressing was less opaque but was overall comparable to the salad dressing prepared with the dispersion of Example 1.

Thirty grams of another protein-free aqueous dispersion having a 20% total solids content (1% xanthan gum, 1% guar gum, 4.52% oat fiber, 9.45% lactose, 2.25% dextrose and 1.76% maltodextrin) wad used in the salad dressing in place of the dispersion of Example 1. The resulting dressing had an appearance and viscosity close to the salad dressing prepared with the dispersion of Example 1.

EXAMPLE 4

A fat-free, chocolate-flavored frozen dessert having a moisture content of about 56% was prepared as follows:

| Ingredient | (Weight %) |
| --- | --- |
| Sugar | 17.9 |
| Non-Fat Milk Solids | 12.7 |
| Polydextrose | 4.7 |
| Cocoa | 2.5 |
| Salt | 0.1 |
| Water | 51.3 |
| Aqueous Dispersion (Example 1) | 10.5 |
| Flavor | 0.3 |

The sugar, milk solids, polydextrose and salt were dry blended to a homogeneous mix. Water was placed in a Stephan TM high-speed mixer followed by the aqueous dispersion and then the dry blend. Mixing was continued for about two minutes at high speed until the mixture was free of lumps. The mixture was then heated to 160° F. (71.1° C.) and maintained at this temperature for five minutes with constant stirring. The flavors were then added. The mixture was then frozen in an ice cream freezer which incorporated air to a 100% overrun. The resulting product was smooth, had a creamy mouthfeel and was not gummy.

EXAMPLE 5

Reduced-fat hamburger patties were prepared and cooked as follows:

| Ingredient | (Weight %) |
| --- | --- |
| Lean Ground Beef (10% Fat) | 98.0 |
| Aqueous Dispersion (Example 1) | 2.0 |

The ingredients were blended together in a Hobart TM mixing bowl. Patties (about 114 grams) of uniform thickness were prepared using a patty press and the formed patties were frozen. Thereafter, the frozen patties were placed on a pre-heated frying griddle and cooked for about 2.5 minutes on each side. The cooked patties were tender but did not fall apart when handled. The cooked patties had good bite and mouthfeel, were uniformally browned throughout and had good flavor. The overall taste was regarded as comparable to patties made entirely of ground beef containing 20% fat.

EXAMPLE 6

A fat-free mayonnaise was prepared as follows:

| Ingredient | (Amount) |
| --- | --- |
| Aqueous Dispersion (Example 1) | 1.4 liters |
| Vinegar | 90 ml. |
| Lemon Juice | 55 ml. |
| Dry Mustard | 4 g. |
| Lecithin | 2 g. |
| Cayanne | pinch |

The aqueous dispersion was placed in a mixer and whipped. 30 ml. of vinegar was added and the mixture was whipped well. The dry ingredients were pre-blended then added to the mixer and mixed well. While mixing at high speed and as the mix thickens, the remaining vinegar is slowly added to thin out the mixture. The lemon juice was then added to lower the pH of the mixture and mixing was continued at a high speed for 3–4 minutes. The resulting mixture was an acceptable substitute for conventional mayonnaise which contains about 80% fat.

We claim:

1. A reduced fat or fat free food product having a moisture content above 45% by weight wherein the reduced fat level is effected by substituting an aqueous dispersion for fat, said dispersion containing polysaccharide hydrocolloid, insoluble fiber and protein at a weight ratio of from 1:0.2–3.5:1.1–4.5 and wherein the dispersion is added to the food product at a level of from 0.05 to 2.0 parts of polysaccharide hydrocolloid per 100 parts of water.

2. The food product of claim 1 wherein fat is replaced by substituting the aqueous dispersion for fat at a weight ratio of 0.5–1.5:1.

3. The food product of claim 1 which is reduced fat hamburger comprising lean ground beef and the aqueous dispersion.

4. The food product of claim 1 wherein the weight ratio of polysaccharide hydrocolloid to insoluble fiber to protein in the aqueous dispersion is 1:0.8–3.0:1.5–3.5.

5. The food product of claim 4 wherein the weight ratio is 1:1.5–2.0:2.0–3.0.

6. The foodstuff of claim 1 wherein the insoluble fiber is present in the foodstuff at a level of from 0.05 to 2.0 parts per 100 parts of water.

7. The foodstuff of claim 1 wherein the moisture content of the foodstuff is above 50%.

8. The food product of claim 1 wherein the food product is essentially fat-free.

9. The food product of claim 1 wherein the polysaccharide hydrocolloid is comprised of anionic gum and galactomannan gum.

10. The food product of claim 9 wherein the ratio of anionic gum to galactomannan gum is from 1:4 to 4:1.

11. The food product of claim 10 wherein the anionic gum contains a carboxylic acid group in its molecular structure.

12. The food product of claim 2 selected from the group consisting of salad dressings, sauces, gravies, meat products, soups, filling and toppings.

13. The food product of claim 1 wherein fat is replaced by substituting the aqueous dispersion for fat at a level of about one part of hydrocolloid for each 40 to 60 parts of fat replaced.

14. The food product of claim 1 wherein the aqueous dispersion has a paste-like consistency and comprises from 5 to 30% solids based on the weight of polysaccharide hydrocolloids, insoluble fiber, protein and water.

* * * * *